BELDEN & FORD.
Tire Tightener.
No. 85,269.    Patented Dec. 29, 1868.
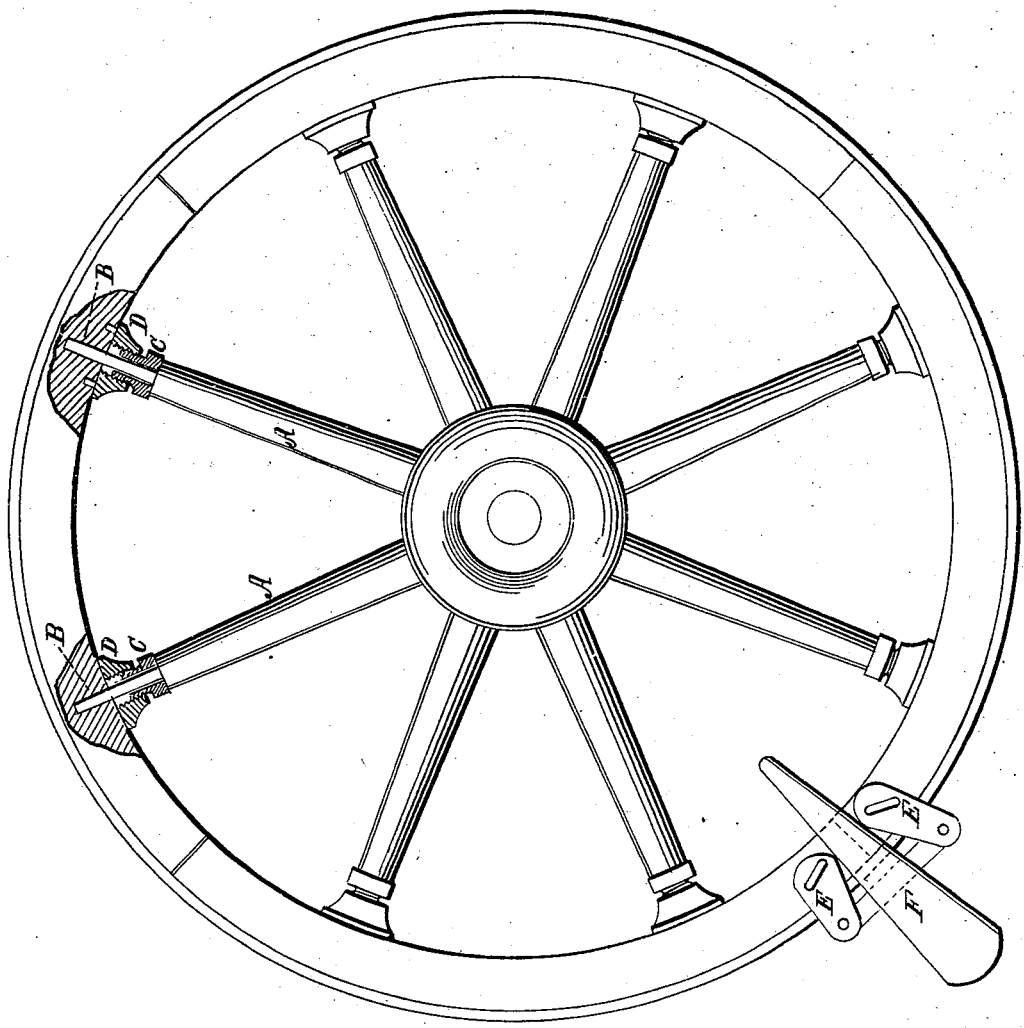
Witnesses.
Geo. N. Strong
J. L. Boone
Inventor.
S. Belden
J. P. Ford
By their Attys Dewey & Co

SALMON BELDEN, OF VISALIA, AND JOHNSON P. FORD, OF SANTA CLARA, CALIFORNIA.

Letters Patent No. 85,269, dated December 29, 1868; antedated December 24, 1868.

IMPROVEMENT IN EXPANSION WAGON-WHEELS.

The Schedule referred to in these Letters Patent and making part of the same.

*To all whom it may concern:*

Be it known that we, SALMON BELDEN, of Visalia, county of Tulare, and JOHNSON P. FORD, of Santa Clara, county of Santa Clara, State of California, have invented an Improved Expansion Wagon-Wheel; and we do hereby declare the following description and accompanying drawings are sufficient to enable any person skilled in the art or science to which it most nearly appertains, to make and use our said invention or improvement without further invention or experiment.

The nature of our invention is to provide a wagon-wheel, so constructed that the felloes can be made to expand against the tire, and avoid the necessity of cutting and resetting the tires.

To do this, the outer ends of ordinary spokes of the wheel are shortened or turned off, and, when shortened, a bolt or pin is introduced into the end of the spoke, passing up a considerable distance, and extending through the felloe in the ordinary way. Nuts are permanently attached to the inner face of the felloes, having openings, through which the extension-spokes pass.

A hollow screw, with a head, is placed upon the extension-rods, and, when turned up, the nuts and felloes are pressed out against the tire, and, when turned in an opposite direction, the felloes are released from their pressure, admitting of an easy adjustment of the wheel.

A double clamp, with wedges, is employed for closing up and tightening the joints remaining after the expansion of the wheel is had, leaving but one opening in the rim of the wheel, which may be filled by a wedge or key.

To more fully illustrate and describe our invention, reference is had to the accompanying drawings, and letters marked thereon, of which—

A A represent the spokes of our wheel, and are inserted into the hub or nave in the usual way, the lower ends being turned away or shortened, and, when shortened, holes are bored lengthwise in the ends, a considerable distance, in which are inserted pins or rods of iron B B, of sufficient length to pass through the felloes. Ordinarily, the ends of the spokes may be turned off, to form a shoulder.

A hollow screw, C, with a head, is slipped on the rods or extensions, and rests against the shoulder of the spoke so formed.

The nuts D D are bell-shaped, and have threads to correspond with the screw, in which they operate. These nuts are attached to the felloes permanently, and, when the screw is turned down, the felloes are pressed out against the tire, and the wheel expanded, and, by turning the screw in the opposite direction, the felloes are loosened.

By this construction, it is intended that the head of the hollow screw shall rest against the shoulder formed by cutting away the end of the spoke.

For forcing the joints of the rim closely together, we employ a double clamp, E E, held to the rim of the wheel.

The clamp is so constructed that an incline-opening is formed between the arms of the clamp at each side of the wheel, in which are placed wedges F F, which are driven down, to crowd the felloes together edgewise, which closes up the joints, leaving but one opening between the arms of the clamps, in which a key of wood or iron is inserted, which may be nailed or clipped to the wheel.

By the use of our device, a wheel may be tightened or loosened, without cutting and upsetting the tire, at any time along the road, and without the aid of a smith or craftsman.

Having thus described our invention,

What we claim, and desire to secure by Letters Patent, is—

The double clamp E E and wedges F F, for forcing the joints of the felloes together, substantially as described.

In witness whereof, we have hereunto set our hands and seals.

SALMON BELDEN. [L. S.]
JOHNSON P. FORD. [L. S.]

Witnesses:
J. L. BOONE,
GEO. H. STRONG.